United States Patent [19]

Hunt

[11] Patent Number: 5,359,670
[45] Date of Patent: Oct. 25, 1994

[54] METHOD FOR IDENTIFYING A SIGNAL CONTAINING SYMMETRY IN THE PRESENCE OF NOISE

[75] Inventor: Alison E. Hunt, Shrewsbury, Mass.

[73] Assignee: The United States of America as represented by the Secretary of the Air Force, Washington, D.C.

[21] Appl. No.: 38,733

[22] Filed: Mar. 26, 1993

[51] Int. Cl.$^5$ .......................... G06K 9/00; G06K 9/64
[52] U.S. Cl. ............................................ 382/8; 382/42; 348/86
[58] Field of Search ................. 382/42, 30, 33, 34, 382/8, 48; 364/728.03, 728.05; 358/101, 105

[56] References Cited

U.S. PATENT DOCUMENTS

| | | |
|---|---|---|
| 3,267,431 | 8/1966 | Greenberg et al. ............ 382/42 |
| 3,614,736 | 10/1971 | McLaughlin et al. ........... 382/34 |
| 3,952,299 | 4/1976 | Hodge et al. .................. 382/34 |
| 4,244,029 | 1/1981 | Hogan et al. .................. 382/42 |
| 4,470,048 | 9/1984 | Short, III ..................... 382/34 |
| 4,637,055 | 1/1987 | Taylor ......................... 382/31 |
| 4,651,341 | 3/1987 | Nakashima et al. ............. 382/34 |
| 4,790,027 | 12/1988 | Scherl ......................... 382/54 |
| 4,958,238 | 9/1990 | Katayama et al. .............. 358/456 |
| 5,025,478 | 6/1991 | Morris et al. .................. 382/22 |
| 5,065,440 | 11/1991 | Yoshida et al. ................ 382/42 |
| 5,149,980 | 9/1992 | Ertel et al. ................... 358/105 |

OTHER PUBLICATIONS

Technical Paper entitled "Location and Identification of Rivets by Machine Vision", by Ernest Franke et al., Society of Manufacturing Engineers, Dearborn, Mich. 48121, 1985.

*Primary Examiner*—Joseph Mancuso
*Assistant Examiner*—David Fox
*Attorney, Agent, or Firm*—Donald J. Singer; Irwin P. Garfinkle

[57] ABSTRACT

The disclosure provides a method for use in a robotic system for identifying fasteners used in aircraft and other applications. The fasteners include rivets (with no slots), bolts (with two slots) and screws with one or two slots. The method accepts as input a family of related signals which are known to contain symmetry. By computing the mean variance of the zero-meaned cross-correlation signals, the method automatically selects those signals which contain pertinent information while disregarding those signals which do not. The accepted signals are then used to create a composite reference signal which can be used to determine the particular fastener type.

3 Claims, 3 Drawing Sheets

CONCENTRIC INTENSITY PROFILES

CONCENTRIC INTENSITY PROFILES

METHOD FOR IDENTIFYING A SIGNAL CONTAINING SYMMETRY IN THE PRESENCE OF NOISE

STATEMENT OF GOVERNMENT INTEREST

The invention described herein may be manufactured and used by or for the Government for governmental purposes without the payment of any royalty thereon.

INTRODUCTION

A method has been developed which operates on a family of noisy image data and yields a value indicating the degree of symmetry about zero, one, or two diameters. This value can then be used to classify the image when it is known that one of these symmetries, but not which one, is present in the image. The method is successful in extracting the desired signal to be examined, despite the presence of noise and the fact that the pertinent signal may be located differently for the three types of symmetric images.

Although this method was developed to aid in the recognition of rivets and therefore operates on signals obtained from image data, it is of a general enough purpose to be useful in other situations where the image to be identified contains similar symmetry. The method assumes only that there is a series of related signals, some of which share a common symmetric property. Because it is not assumed by the method that the source of these signals is an image, this method could find applicability in areas other than image processing.

BACKGROUND OF THE INVENTION

This method of this invention includes an algorithm which has been implemented in the Robotic Deriveting and Drilling work cell, an automatic fastener removal system currently being developed for use within the aerospace structural repair industry by Westinghouse Electric Corporation. A similar system is described in an article entitled Location and Identification of Rivets By Machine Vision, By Franke, Michalsky and McFalls, presented at Vision '85, Mar. 25-28, 1985, Society of Manufacturing Engineers, Dearborn, Mich. The Franke et al paper is included in the disclosure information statement submitted with this application.

A major difficulty in identification of the fastener type lies in the fact that there were five different types of fasteners, which may be grouped into three general classes, and hence there are three different spatial signals to differentiate, but each signal may be located in a different position, depending on fastener type. These fasteners were classified as having 2, 1 or no slots. The system described by Franke et al solves the problem of variability of signal location by requiring a priori knowledge of the expected fastener type. Because the information required to differentiate fastener type is contained in different parts of the image depending upon the fastener type being examined, the Franke et al system uses knowledge of the expected fastener type to decide where in the image to gather intensity data. The method disclosed in accordance with this invention solves this problem without requiring information regarding the expected fastener type. This method accepts a uniform template of data, equally spaced concentric circles of intensity data, from any fastener independent of type. The method then is able to intelligently decide which of these signals contains the pertinent information which is to be processed further.

SUMMARY OF THE INVENTION

This invention provides a method which accepts as input a family of related signals which are known to contain symmetry. By computing the mean variance of the zero-meaned correlation signal, it automatically selects those signals which contain pertinent information while disregarding those signals which do not. These accepted signals are then used to create a composite reference signal which can be used in later analysis.

OBJECTS OF THE INVENTION

It is an object of this invention to provide a method which accepts as input a family of related signals which are known to contain symmetry and to compute the mean variance of the zero-meaned correlation signal, sometimes referred to herein as "power", so as to automatically select those signals which contain pertinent information while disregarding those signals which do not.

Another object of this invention is to use the selected cross-correlation signals to create a composite reference signal which can be used in later analysis.

BRIEF DESCRIPTION OF THE DRAWINGS

For further objects, and for a clearer understanding of the nature of the invention, reference would now be made to the following detailed specification, and to the accompanying drawing in which.

DETAILED DESCRIPTION OF A PREFERRED EMBODIMENT

Figure 1:
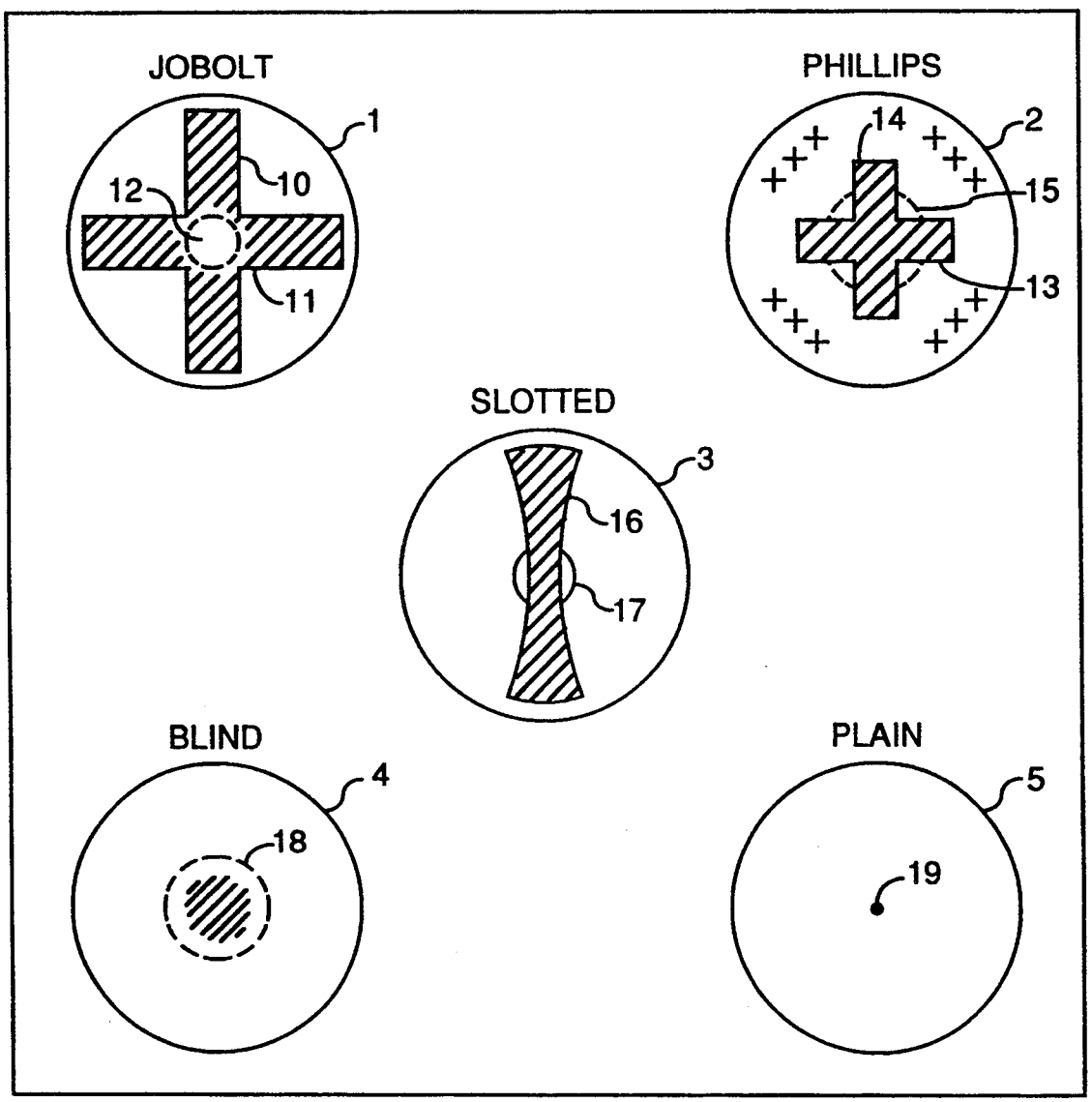
FIG. 1 illustrates 5 typical connectors which are identified in accordance with the method of this invention.

Referring first to FIG. 1, there are shown five different types of fasteners that are normally used in the manufacture of aircraft structures. The include a Jobolt 1, a phillips head screw 2, a slotted screw 3, a blind rivet 4 and a plain rivet 5.

The method assumes the establishment of a data base consisting of the theoretically expected intensity signals for each of three classes of fasteners (i.e. two slots, one slot and no slot). In the robotic system for which this invention was made, the object was to remove fasteners from an air frame. To do so it was necessary to determine which of the five types of fasteners in FIG. 1 were being viewed by the robot. Thus, for removing fasteners, which include bolts, screws and rivets, the fasteners to be identified were scanned by a video camera, yielding a video image in the computer memory. The power was computed for each of a plurality of concentric circles obtained from the video image in memory for each of the fasteners. When a fastener image is scanned, if slots are present, as in the Jobolt 1 and Phillips 2, the slots produce significantly different intensity from the rest of the fastener, and therefore, the computed power index distinguishes between fasteners which have two slots, one slot, or no slots, and which can distinguish fasteners by the lengths of the slots (the Jobolt has longer slots than the Phillips).

Figure 2A:
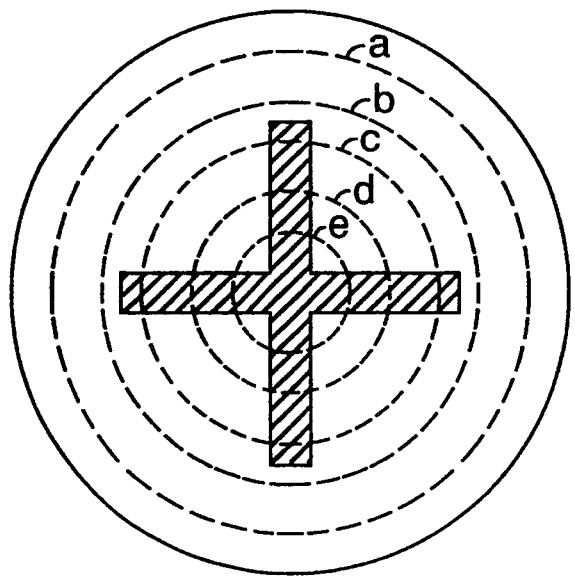
FIGS. 2A and 2B illustrate a family of signals representing intensity profiles obtained from concentric circles a through e within a fastener's image
Figure 2B:
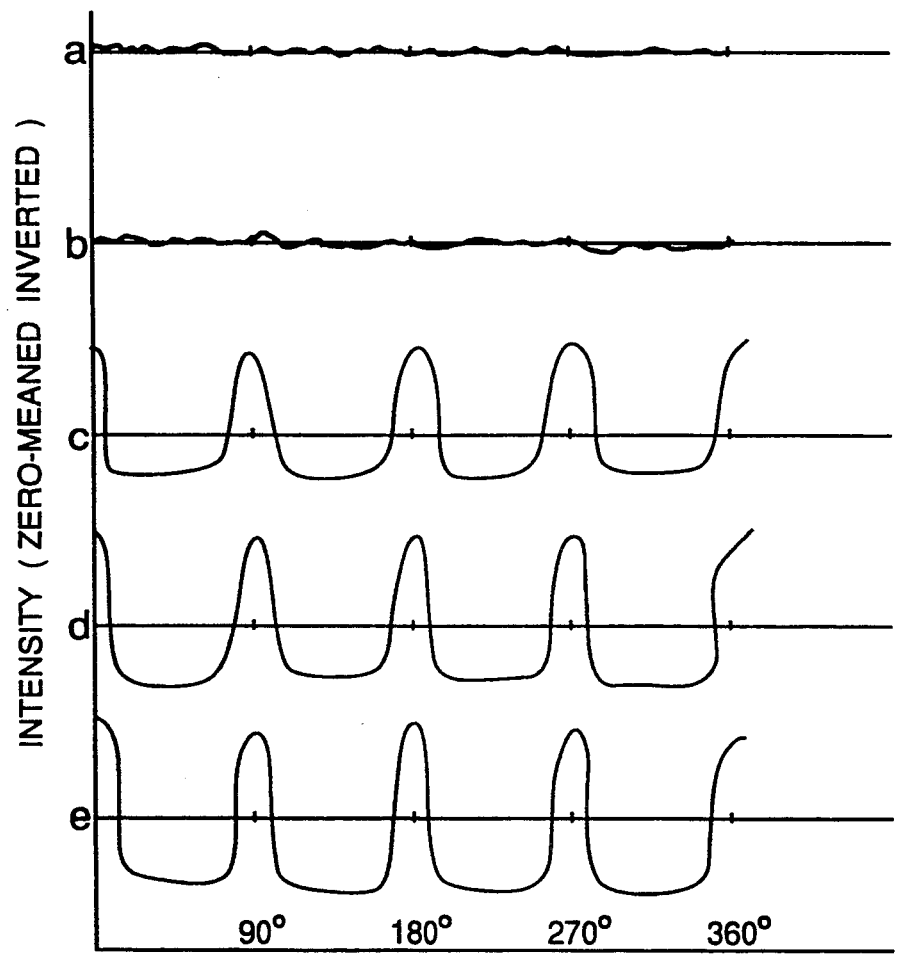
Figures 3A, 3B, 3C:
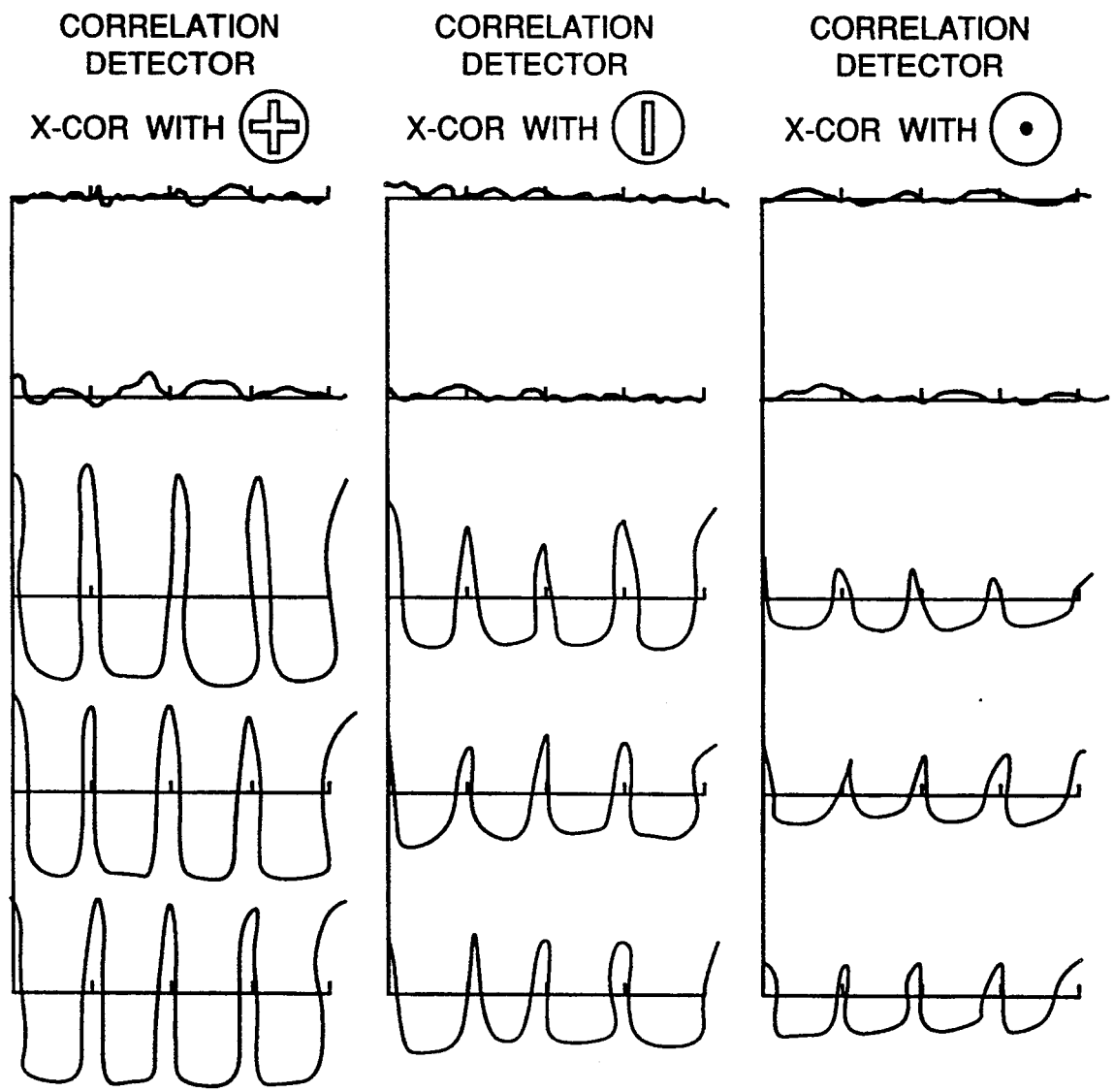
FIG. 3 shows the cross-correlation of the example Jobolt fastener with the three possible fasteners: two slots (FIG. 3A), one slot (FIG. 3B), and no slots (FIG. 3C).

The method is executed as follows:

First the fasteners are imaged by the imaging system carried by the robotic system. A family of signals representing intensity profiles are obtained from concentric circles within the fastener's image. See FIGS. 2A and 2B in which it is illustrated how a family of signals representing intensity profiles are obtained from concentric circles a through e within the fastener's image, in the case illustrated, as a Jobolt 1. Then:

1. Compute the cross correlation of each intensity profile of the fastener with the expected signal for each of the three possible symmetric signals, that is are there two slots, one slot or no slots. See FIG. 3 which shows the cross-correlation of the example Jobolt with fasteners with two slots (FIG. 3A), one slot (FIG. 3B), and no slots (FIG. 3C).
2. For each of the three cross-correlations the following steps are executed:
   a. Find zero-meaned 'power' of these cross-correlations, that is, the average variance of the zero-meaned cross-correlation. This step requires the computing of the Root Mean Squared (RMS) power of the zero meaned signal of each correlation.
   b. Find the maximum value among these powers.
   c. Find all the cross-correlations whose power is equal to or greater than 50% of the maximum power. These are the profiles which contain the most information indicating either presence or absence of the particular symmetry. In the specific application of identifying fasteners, this symmetry is the intensity difference caused by the presence of a slot.
   d. Find the average value of the powers passing the 50% test above.
   e. Using these selected cross-correlations, compute the average correlation profile indicating presence of symmetry. Compute the 'power' of this average correlation profile.
   f. Compute the ratios relating the powers of the average correlation profiles for each of the expected signals (the possible forms of symmetry). Comparison of these ratios indicates which of the expected symmetric signals is present in the data being examined.

NOVELTY AND DIFFERENCES FROM EXISTING METHOD

The gist of this invention is the ability to automatically select those certain signals from a family of related signals which contain pertinent information while rejecting those signals which do not, and then using those selected signals to create a composite signal which characterizes all the pertinent information.

The existing Franke et al deriveting system does not address the issue of finding pertinent information among many signals, and therefore offers no basis for comparison.

Because this is a generic approach to signal processing, this method should instead be compared to other signal processing techniques which attempt to isolate a signal when it is corrupted by noise. The concept of cross-correlating a signal containing noise with the ideal form of the expected signal is not original. This is a common technique known as a correlation detector, similar in concept to a matched filter.

This method uses the correlation detector technique, however, to introduce two new concepts. The first novel concept is the computation of the average variance of the zero-meaned correlation (sometimes referred to here as the 'power' of the correlation signal) as a measure of information content and subsequently as an index of which signals among a family of signals contain pertinent information. The second novelty is the ability to decide which of several possible signals is present amid noise, not just to discern one expected signal in the presence of noise.

As a consequence of obtaining the power value, this method also yields a composite 1-dimensional signal representative of the pertinent information contained in the image but lacking the unnecessary irrelevant information (noise). This composite signal can then be used in later analysis as a reference against which to measure other criteria.

Although the invention has been described with reference to a particular embodiment, it will be understood to those skilled in the art that the invention is capable of a variety of alternative embodiments within the spirit and scope of the appended claims.

What is claimed is:

1. A method for identifying an unknown one of a plurality of types of fasteners, the video images of known fasteners of said types having been obtained by means of a robotic scanning system to provide a known family of related symmetric signals, the data resulting from said scanning having been stored in a computer, said method comprising the steps of:

scanning said unknown fastener in concentric circles with said robotic imaging system to provide a video image of said unknown fastener, said video image comprising a family of signals representing the intensity profiles from said concentric circles centered on the center of the image of the unknown fastener;

storing said family of signals in said computer;

computing the cross correlation of each intensity profile of the scanned unknown fastener with stored symmetric signals representing said known family of signals; and for each of said cross-correlations:

a. computing the root mean squared power signal of each cross-correlation (the power of said cross-correlations);
   b. determining the maximum value among said powers;
   c. selecting all the cross-correlations whose power is equal to or greater than 50% of the maximum power;
   d. using said selected cross-correlations, computing the average correlation profile indicating the presence of symmetry, and then computing the power of said average correlation profile;
   e. computing the ratios relating the powers of said average correlation profiles for each of the expected signals; and
   f. comparing the computed ratios to indicate which of the expected known symmetric signals is present in the data being compared.

2. The method of claim 1, wherein said fasteners have 2 slots, no slots or 1 slot, and wherein the average power for each of the three cross-correlations is determined by the presence, absence and the number of said slots.

3. The method of claim 2, wherein the video image of said fasteners is obtained and used to derive the intensity profiles of a plurality of concentric circles, said circles intercepting said slots, if present.

* * * * *